US008761606B2

(12) United States Patent
Habif

(10) Patent No.: US 8,761,606 B2
(45) Date of Patent: Jun. 24, 2014

(54) SYSTEMS AND METHODS FOR QUANTUM ILLUMINATION DETECTION FOR OPTICAL COMMUNICATIONS AND TARGET DETECTION

(75) Inventor: Jonathan Lenahan Habif, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 762 days.

(21) Appl. No.: 12/973,359

(22) Filed: Dec. 20, 2010

(65) Prior Publication Data

US 2012/0076503 A1    Mar. 29, 2012

Related U.S. Application Data

(60) Provisional application No. 61/387,859, filed on Sep. 29, 2010.

(51) Int. Cl.
*H04B 10/00*    (2013.01)
(52) U.S. Cl.
USPC ........................... 398/140; 398/118; 356/326
(58) Field of Classification Search
USPC ......... 398/140, 151, 157, 169, 170, 118, 128, 398/130, 25, 33; 356/326, 300, 302, 303, 356/309, 317
See application file for complete search history.

(56) References Cited

U.S. PATENT DOCUMENTS

| 6,897,434 B1 | 5/2005 | Kumar et al. |
| 2009/0290162 A1 | 11/2009 | Erkmen et al. |
| 2010/0177297 A1* | 7/2010 | Guha et al. .................. 356/4.01 |

OTHER PUBLICATIONS

Guha. "Receiver design to harness quantum illumination advantage." Proc. of the IEEE Int'l. Symp. on Information Theory (ISIT 2009). (Jun. 28, 2009-Jul. 3, 2009).
Guha et al. "Gaussian-state quantum-illumination receivers for target detection." Physical Review (Oct. 8, 2009).
Li, X., et al, "All-fiber source of frequency-entabled photon pairs," Physical Review A 79, 033817 pp. 033817-1-033817-9 (2009).
Eckstein, A., et al, "Broadband frequency mode entanglement in waveguided parametric donwconversion," Opticla Letters, vol. 33, No. 16, pp. 1825-1827, Aug. 15, 2008.
Shimizu, R., et al., "High-flux and broadband biphoton sources with controlled frequency entanglement," Optics Express, vol. 17, No. 19, pp. 16385-16393, Sep. 14, 2009.

(Continued)

*Primary Examiner* — M. R. Sedighian
(74) *Attorney, Agent, or Firm* — Ropes & Gray LLP

(57) ABSTRACT

A detection system including a receiver, a transmitter, and a processor for stealthy target detection or optical communications is described. Optical communications may be spread spectrum encoded communications over a bright background communication channel. The transmitter includes a quantum frequency entanglement source for outputting a signal beam and an idler beam, and transmission optics for directing the signal beam towards a remote surface. Photons in the idler beam are quantum-mechanically entangled in frequency with photons the signal beam. The transmitter includes a first spectrometer for measuring a frequency band associated with photons in the idler beam. The receiver includes a second spectrometer for identifying the frequency band associated with the photons in the received return beam. The system includes a processor configured to process the output of the spectrometers to determine the presence of a target in a target region or a message encoded in the received return beam.

20 Claims, 10 Drawing Sheets

(56) References Cited

OTHER PUBLICATIONS

Avenhaus, M., et al., "Experimental verification of high spectral entanglement for pulsed waveguided spontaneous parametric down-conversion," Physical Review A 79, pp. 043836-1-043836-5 (2009).

Seward et al., "Daylight demonstration of a low-light-level communication system using correlated photon pairs," Quantum Optics, 3(4):201-207 (1991).

International Search Report and Written Opinion for International Application No. PCT/US2011/041434 mailed Feb. 10, 2012.

\* cited by examiner

SYSTEMS AND METHODS FOR QUANTUM ILLUMINATION DETECTION FOR OPTICAL COMMUNICATIONS AND TARGET DETECTION

CROSS-REFERENCE TO RELATED APPLICATIONS

This application claims priority to U.S. Provisional Patent Application No. 61/387,859, filed Sep. 29, 2010. The contents of this application are incorporated herein in their entirety.

BACKGROUND OF THE INVENTION

1. Field of the Invention

The invention relates to the field of optical detection systems for target detection, optical communications, imaging, and range estimation. More particularly, this invention relates to the field of quantum illumination detection systems for stealthy target detection, stealthy optical communications, imaging, and range estimation.

2. Background Information

Optical or optoelectrical systems have long been used in various sensing applications, including but not limited to target detection, communications, imaging, and range estimation. Target detection systems include a transmitter for interrogating or illuminating a target region, and a receiver for detecting a return signal representative of the presence or absence of an object in the target region. Communications systems include a transmitter for transmitting a modulated signal to a receiver across a noisy channel. The receiver receives a noisy modulated signal and deciphers the modulated signal from the presence of noise.

Some target detection systems employ coherent-light laser beams in the transmitter, the receiver, or in both the transmitter and receiver. These systems are collectively referred to as Laser Radar or Laser Detection and Ranging (LADAR) systems. In the simplest LADAR target detection system, for example, the presence of a target is detected by the transmitter shining a laser beam towards the target region, and the receiver determining whether any of the transmitted laser light is reflected back. Laser beams are created by stimulating the emission of light "photons" from atoms. As these atoms lose energy, they emit photons, which are collected and transmitted as a laser beam. Coherent laser beams include photons which have a fixed phase relationship with one another. The phase relationship may be temporal, spatial, or spatio-temporal.

In optical communication systems that use laser beams, the laser beam to be transmitted by the transmitter is modulated and/or encoded so that this laser beam carries information that is transmitted to a receiver. The receiver then demodulates and/or decodes the received laser beam.

However, for both targets and for receivers located far away from the source of the transmitted laser beam, only a small fraction of the transmitted laser beam is reflected back from the target region to the receiver. In addition, if the target region contains other light sources or thermal radiation (collectively referred to as "noise" sources), it may be very difficult to distinguish the component of the return signal containing light reflected off the target from that contributed by noise, because the return signal-to-noise ratio of the return light beam is very low. While this noise decreases the probability of detection of a target by a target detection system, in optical communication systems, the presence of this noise may be exploited for stealthy communication of messages from the transmitter to the receiver.

A different kind of state of light, called quantum-mechanically entangled light, can be created by nonlinear crystals which are pumped by lasers. Quantum entanglement refers to the phenomenon that the quantum mechanical state of one photon in the pair is correlated with the quantum mechanical state of the other photon in the pair in a way that is stronger than any classical system. For instance, if the polarization state of one of the photons is known, then the polarization state of the other photon is known. Or perhaps, if the frequency or wavelength of one photon is known, then the frequency or wavelength of the other photon is known, too. Or perhaps, if the phase of one photon is known, then the phase of the other photon is known, too.

Recent research into a method called "quantum-illumination" predicts that with the use of quantum-mechanically entangled light to interrogate or illuminate distant objects, significant enhancements may be achieved over the use of unentangled/coherent light for detecting those objects. However, only one known detection system exists for realizing these theoretical predictions of enhancement. This system primarily uses quantum-mechanically phase-entangled light, is described in commonly-owned U.S. patent application Ser. No. 12/610,739 (Published U.S. Patent Application No. 20100177297), the contents of which are incorporated herein in their entirety. Therefore, there is a need for other practically realizable joint-detection optical receivers that exploit this significant quantum-mechanical enhancement in stealthy target detection, stealthy optical communications, imaging and range estimation systems.

SUMMARY OF THE INVENTION

The systems and methods described herein in various embodiments provide for quantum illumination receivers that exploit frequency-entangled light transmitters to allow for improved stealthy target detection, improved stealthy optical communications (e.g., spread spectrum-encoded over a bright background communication channel which masks the transmitted photons), imaging and range estimation performance, even under low signal-to-noise ratio operating conditions.

In one aspect, the invention relates to a detection system comprising a transmitter, a receiver, and a processor. The transmitter and the receiver are in communication with the processor. The transmitter includes a quantum frequency entanglement source for outputting an output beam including a signal beam and an idler beam. The photons in the idler beam are quantum-mechanically entangled in frequency with corresponding photons in the signal beam. The transmitter further includes transmission optics for directing the signal beam towards a remote surface, and a first spectrometer for measuring a frequency band associated with photons in the idler beam. The receiver includes a beam collector for receiving a return beam including photons from the signal beam reflected by the remote surface. The receiver also includes a second spectrometer for identifying the frequency band associated with the photons in the received return beam. The processor is configured to process the outputs of the first and second spectrometers to determine one of the presence of a target in a target region or a message encoded in the received return beam.

In some embodiments, the remote surface is a target and the system is a target detection system. The processor is then configured to determine the presence of the target in a target region. Optionally, the processor is further configured to control a delay of the received idler beam based on a distance between the transmitter and the remote surface. In some embodiments, the delay is provided by a delay circuit within the receiver.

In some embodiments, the remote surface modulates the signal beam and the system is an optical communication system. The processor is then configured to decode the message encoded within the received return beam.

In some embodiments, the receiver includes a frequency splitter for splitting the received return beam into a series of frequency bands associated with photons in the received return beam. The frequency splitter is configured to be tunable to the frequency band associated with the photons in the idler beam.

In some embodiments, the first spectrometer includes an array of single-photon detectors configured to detect photons associated with the idler beam. In some embodiments, the second spectrometer includes an array of single-photon detectors configured to detect photons associated with the received return beam.

In some embodiments, the quantum frequency entanglement source includes a spontaneous parametric downconverter (SPDC). In some embodiments, the quantum frequency entanglement source includes a laser pump for directing a laser beam into the SPDC to entangle the signal and idler beams in frequency. In some embodiments, the quantum frequency entanglement source includes a nonlinear crystal that is constructed from a material selected from the group comprising lithium niobate and potassium titanyl phosphate.

In some embodiments, the system includes a user interface in communication with the processor for selecting a parameter associated with the system.

In another aspect, the invention relates to a method for operating a detection system. The method includes outputting, by a quantum frequency entanglement source of a transmitter, an output beam including a signal beam and an idler beam, wherein the photons in the idler beam are quantum-mechanically entangled in frequency with corresponding photons in the signal beam. The method further includes directing, by transmission optics of the transmitter, the signal beam towards a remote surface, and measuring, by a first spectrometer of the transmitter, a frequency band associated with photons in the idler beam. The method also includes receiving, by a beam collector of a receiver, a return beam including photons from the signal beam reflected by the remote surface. The method further includes identifying, by a second spectrometer of the receiver, the frequency band associated with the photons in the received return beam. The method also includes processing, by a processor in communication with the receiver and the transmitter, the outputs of the first and second spectrometers to determine one of the presence of a target in a target region or a message encoded in the received return beam.

In some embodiments, the remote surface is a target and the system is a target detection system. The method then further includes determining, by the processor, the presence of the target in a target region. Optionally, the method includes controlling, by the processor, a delay of the received idler beam based on a distance between the transmitter and the remote surface. The delay may be provided by a delay circuit.

In some embodiments, the remote surface modulates the signal beam and the system is an optical communication system. The method then further includes decoding, by the processor, the message encoded within the received return beam.

In some embodiments, the method includes splitting, by a frequency splitter, the received return beam into a series of frequency bands associated with the photons in the received return beam.

In some embodiments, the first spectrometer includes an array of single-photon detectors, and the method further includes detecting, by the array of single-photon detectors, photons associated with the idler beam.

In some embodiments, the second spectrometer includes an array of single-photon detectors, and the method further includes detecting, by the array of single-photon detectors, photons associated with the received return beam.

In some embodiments, the method includes selecting, by a user interface in communication with the processor, a parameter associated with the system. The parameter may be a delay or a frequency associated with photons of the idler beam.

In this application, embodiments will be described in reference to a quantum-illumination detection system including a transmitter, a receiver, and a processor. It is to be understood that the systems and methods discussed herein are applicable to any optical spread spectrum-encoded, electrical, or opto-electrical system including, but not limited to, stealthy optical target-detection, stealthy optical spread spectrum-encoded communications, sensing, and imaging systems.

BRIEF DESCRIPTION OF THE DRAWINGS

The invention description below refers to the accompanying drawings, of which.

DESCRIPTION OF CERTAIN ILLUSTRATIVE EMBODIMENTS

To provide an overall understanding of the invention, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

The illustrative embodiments described in reference to FIGS. 1A-5, include a detection system including a quantum illumination transmitter and a quantum illumination receiver. The transmitter includes a quantum entanglement source that outputs an output beam including a signal beam and a return beam. The corresponding photons in each of the beams are quantum mechanically entangled in frequency. The received return beam, when used in conjunction with information on the output beam, allows for significantly improved stealthy target detection and stealthy optical communications, even under low signal-to-noise ratio conditions. In the description that follows, embodiments will primarily be described with respect to detection systems, however, wherever appropriate, modifications of these systems for specific applications such as target detection or optical communications are described.

Figure 1A:
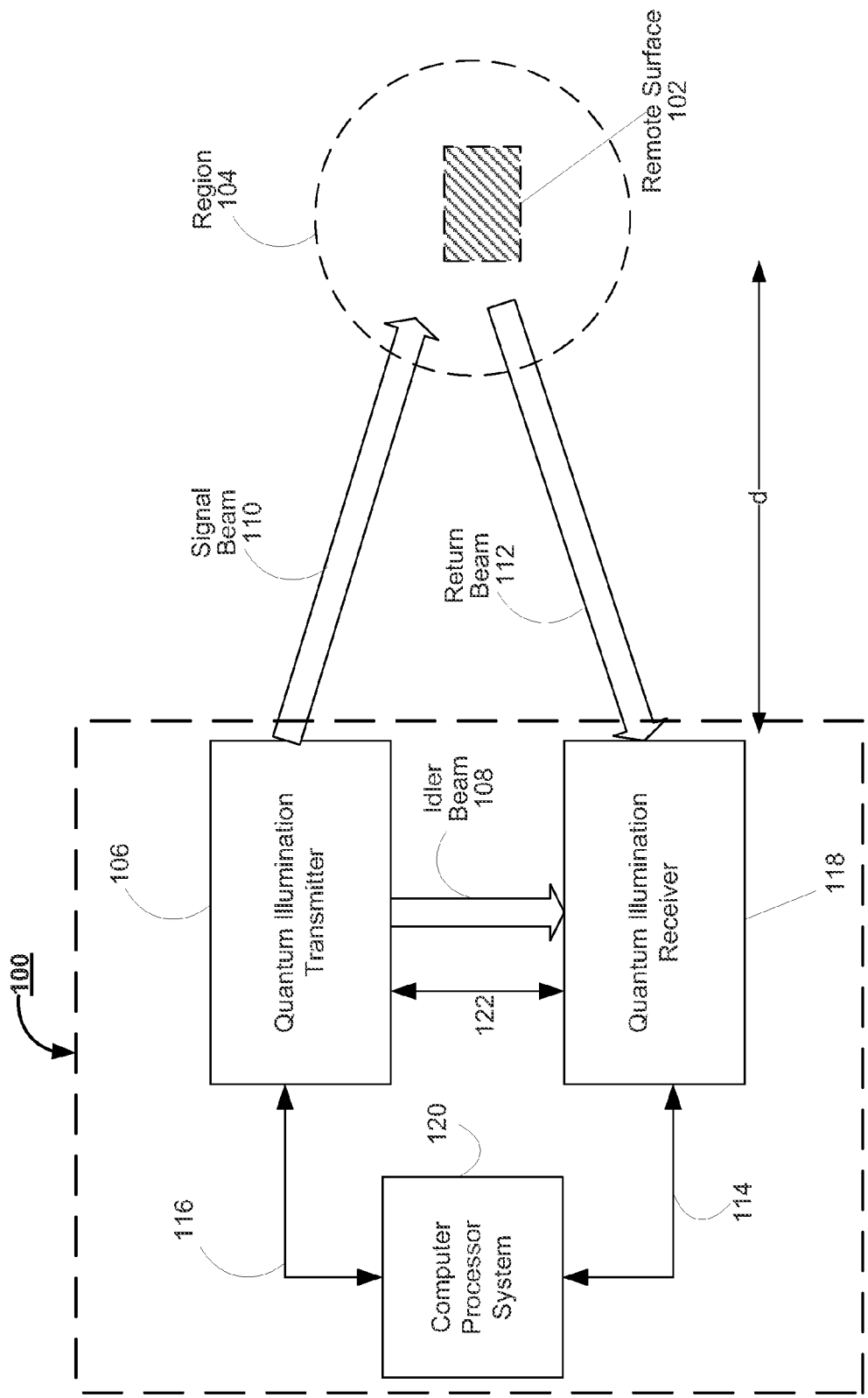
FIG. 1A is a block diagram of a laser-based detection system, according to an illustrative embodiment.

FIG. 1A is a block diagram of a quantum illumination detection system 100, according to an illustrative embodiment. Detection system 100 may be either a target detection system or an optical communication system as described below. System 100 includes a quantum illumination transmitter 106 and a quantum-illumination receiver 118. In addition, system 100 includes a computer processor system 120 ("processor") that is in communication with both transmitter 106 (via link 116) and receiver 118 (via link 114). There may also be an electrical or optical link 122 between the receiver 118 and the transmitter 106. In system 100, it is assumed that the target 102 is at a distance d from the receiver 118 and/or transmitter 106.

In operation, detection system 100 outputs an output beam including a signal beam 110 and an idler beam 108, wherein the photons in the idler beam 108 are quantum-mechanically entangled in frequency with corresponding photons in the signal beam 110. The output beam may be generated using any suitable quantum mechanical entanglement source, examples of which are described below with respect to FIGS. 1B and 1C. The signal beam 110 is directed towards a remote surface 102 within region 104. A spectrometer within the transmitter 106 is used to measure a frequency band associated with photons in the idler beam 108. This measurement may occur within the transmitter 106 and/or the receiver 118. Thus, this measurement may occur prior to, concurrent with, or after the signal beam 110 has been directed away from the transmitter 106. The return beam 112, including photons from the signal beam 110 reflected by the remote surface 102 within region 104, is received by a beam collector within receiver 118. A spectrometer within receiver 118 is used to determine the frequency band associated with the photons in the received return beam 112. Processor 120 processors the outputs of the first and second spectrometers as described below.

In operation as a target detection system, remote surface 102 is a target 102 within a target region 104, and system 100 detects the presence or absence of the target 102 in the target region 104 by the transmitter 106 generating and emitting a signal beam 110 towards target region 104, and generating and emitting an idler beam 108 whose photons are quantum mechanically entangled in frequency with corresponding photons in the generated signal beam 110, to receiver 118. Receiver 118 then determines the presence of target 102 by processing the received return beam 112 and the retained idler beam 108. In some target detection applications, e.g., for applications in which joint-detection is employed, it is useful to delay the retained idler beam 108 before processing it together with the received return beam 112. In these applications, the idler beam 108 is synchronized with the return beam 112 based on an estimate of the distance d and/or a (time) delay in receiving the return beam 112, as described below in relation to FIG. 1C or 1D.

In operation as an optical communications system, remote surface 102 is a reflective surface 102 within a region 104, and the remote surface 102 in the region 104 acts as a communication message source which modulates the signal beam 110 that is transmitted by the transmitter 106 towards region 104, thereby encoding a message in the return beam 112. In these applications, the remote surface 102 may include a reflective mirror for modulating the signal beam 110. Processor 120 then determines the encoded message by processing, in conjunction with receiver 118, the received return beam 112 using information about frequency band(s) associated with photons in the idler beam 108.

For a target detection system 100 or an optical communication system 100, transmitter 106 and receiver 118 are preferably located in the same physical location, and may be combined into a single device or subsystem. Alternatively, the transmitter and receiver functions can be separated into independent devices in communication with each directly via link 122 or indirectly through the processor 120. For both target detection systems and optical communication systems, the signal beam 110 and idler beam 108 will be generated by transmitter 106, and a measurement of the corresponding photons in the idler beam is used by the processor 120 to analyze the return beam 112.

The components of transmitter 106, receiver 118, and processor 120 will be described in detail in relation to FIGS. 1B-1C, 1D-1F, and 1H, respectively. In the following descriptions, references will also be made to components in FIG. 1A.

Figure 1B:
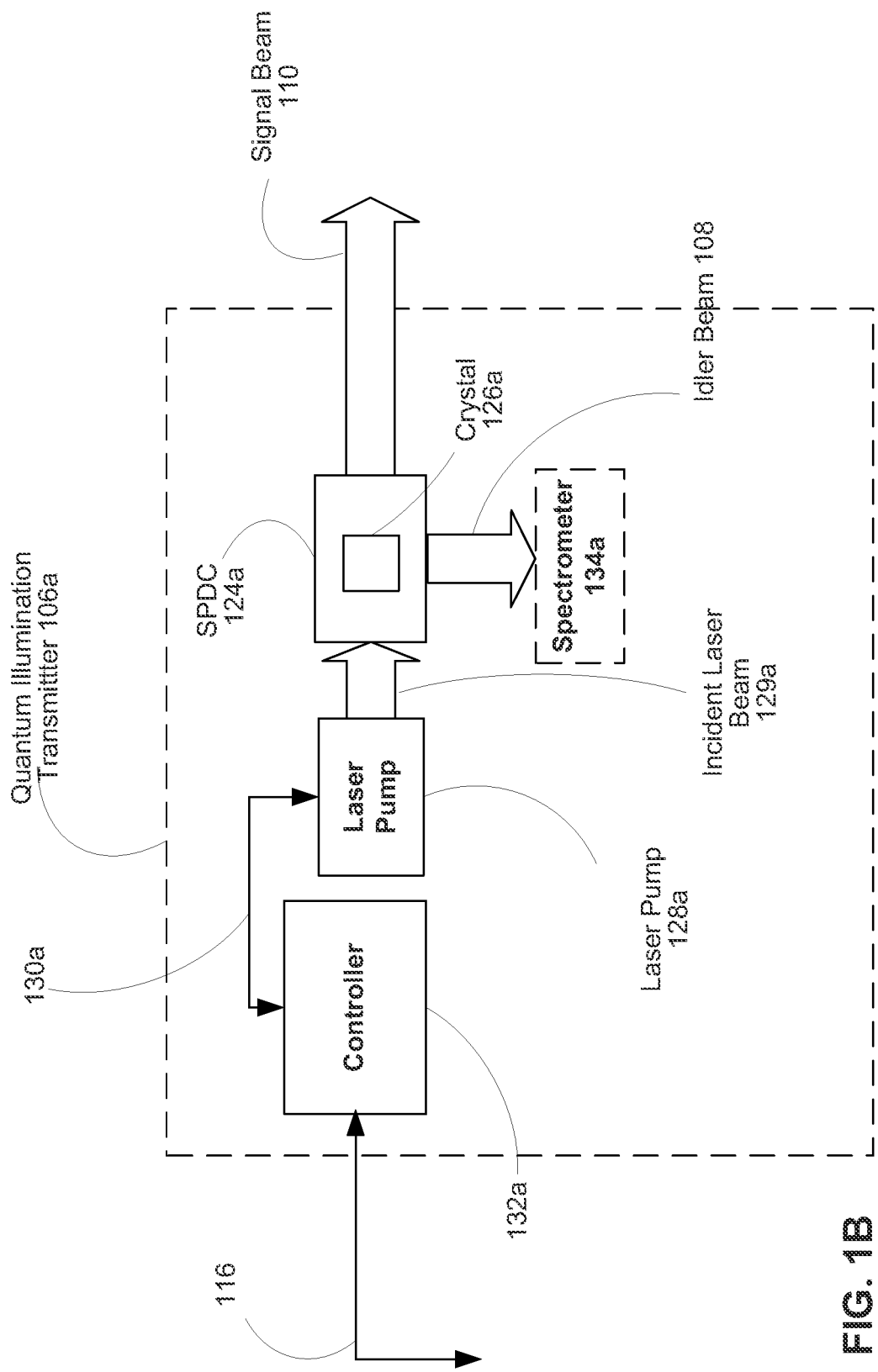
FIG. 1B is a block diagram of a spontaneous parametric down conversion (SPDC) frequency-entanglement source-based transmitter for the system of FIG. 1A, according to an illustrative embodiment.

FIG. 1B is a block diagram of an illustrative embodiment of a transmitter 106a suitable for use as transmitter 106 in the target detection system 100 of FIG. 1A. In this embodiment, transmitter 106a includes a laser pump 128a and a spontaneous parametric down converter (SPDC) 124a. Optionally, the transmitter 106b may include a spectrometer 134b. Spectrometer 134b may be used to measure frequency characteristics of photons in a laser beam, e.g., idler beam 108. The spectrometer 134b and/or the laser pump 128a may be controlled by controller 132a via communication link 130a. In turn, the controller 132a may be in communication with computer processor system 120 via communication link 116. The communication links 116 and 130a may be any suitable optical, electrical, or opto-electrical wired or wireless link.

SPDC 124a in transmitter 106a generates the signal beam 110 and the idler beam 108 using the incident laser beam 129a from the laser pump 128a. In some embodiments, the SPDC 129a may emit photon pairs at a rate of about 1 million photons/second. This number of photons is also referred to as the mean photon number.

The signal and/or idler beams may comprise several different "modes." A mode corresponds to the spatial and temporal patterns or structure of an optical field. For instance, a laser may be emitting Gaussian modes in which the spatial optical intensity pattern of the wavefront may be described using a Gaussian function. Such a laser beam is referred to as a Gaussian beam. Each of the modes in a Gaussian beam have an associated wavelength or frequency. In some embodiments, the incident laser beam 129 includes a Gaussian beam with only two modes. Each of these two modes may correspond to a particular frequency or wavelength of photons that constitute the Gaussian beam. More particularly, frequency-entangled (or equivalently, wavelength-entangled) photons have unique characteristics. Measured individually, the signal-idler photon pairs exhibit broad spectrum uncertainty ($\delta\omega$) in their respective frequency bands. However, the sum ($\Delta\omega$) of their respective frequency bands is narrow enough that a measurement of the frequency band associated with one of the photons of the pair, e.g., the idler beam 108, allows an accurate determination of the frequency band associated with the other photon of the pair, e.g., the signal beam 110. For instance, if the frequency associated with the photons of the idler beam 108 is f, and a measurement of the sum of frequencies is denoted F, then the a measurement of F allows for the determination of f because of the frequency entanglement of the photons of the idler beam 108 and corresponding photons of the signal beam 110.

The ratio $R=\delta\omega/\Delta\omega$ of the coincidence bandwidth ($\Delta\omega$) to the spectral bandwidth ($\delta\omega$) of one of the signal-idler photon pairs is an indication of this frequency uncertainty. As described below, in receiver 118, this measurement of the idler frequency band can be used to tune an optical frequency splitter such that only this frequency band in the return beam 112 received by receiver 118 is analyzed. Thus, a measurement of the frequency band of the idler beam 108 or the signal beam 110, allows for the determination of an appropriate tuning frequency for a frequency splitter within quantum illumination receiver 118 for selecting a suitable frequency band for the received return beam 112. In some embodiments, a user interacting with a user interface of computer processor system 120 selects the tuning frequency, which is a parameter of detection system 100.

SPDC 124a also includes a nonlinear crystal 126a which is used to perform spontaneous parametric downconversion. The nonlinear crystal 126a may be constructed from any suitable material, e.g., lithium niobate, lithium tantalate, potassium niobate, potassium titanyl phosphate, potassium dihydrogen phosphate, potassium dideuterium phosphate, lithium triborate, cesium lithium borate, cesium borate, yttrium calcium oxyborate, strontium beryllium borate, zinc germanium diphosphide, silver gallium sulfide, silver gallium selenide, cadmium selenide, silicon dioxide, gallium arsenide, or any combination thereof.

Spontaneous parametric downconversion refers to the process by which photons in each mode of the incident laser beam 129a from the laser pump 128a are split into pairs of photons by nonlinear crystal 126a such that the combined energy and momentum of each pair of photons equals the energy and momentum, respectively, of the originating photon. The nonlinear crystal 126a is passive and does not provide additional energy and/or momentum to the original photon. One photon in the pair of photons is used as a signal photon and the other photon is used as an idler photon. The signal-idler photon pair in each mode is quantum-mechanically entangled and is thus in a joint entangled state. The signal-idler photon pair thus created is quantum-mechanically entangled in terms of frequency. Thus, if the frequency of one photon in the pair is measured or determined, the frequency of the other photon in the pair is immediately ascertained as a result of the quantum-mechanical phenomenon of "wave-function collapse." In this manner, crystal 126a in SPDC 124a splits photons in the incident laser beam 129a to create signal beam 110 and idler beam 108. In some embodiments, SPDC 124a is a type-I SPDC, while in other embodiments, SPDC 124a is a type-II SPDC. As described in reference to FIG. 1C, 1D, or 1E, the entanglement of signal-idler photon pairs can be exploited to detect the presence or absence of target, or an encoded communication from an optical communications system transmitter.

Figure 1C:
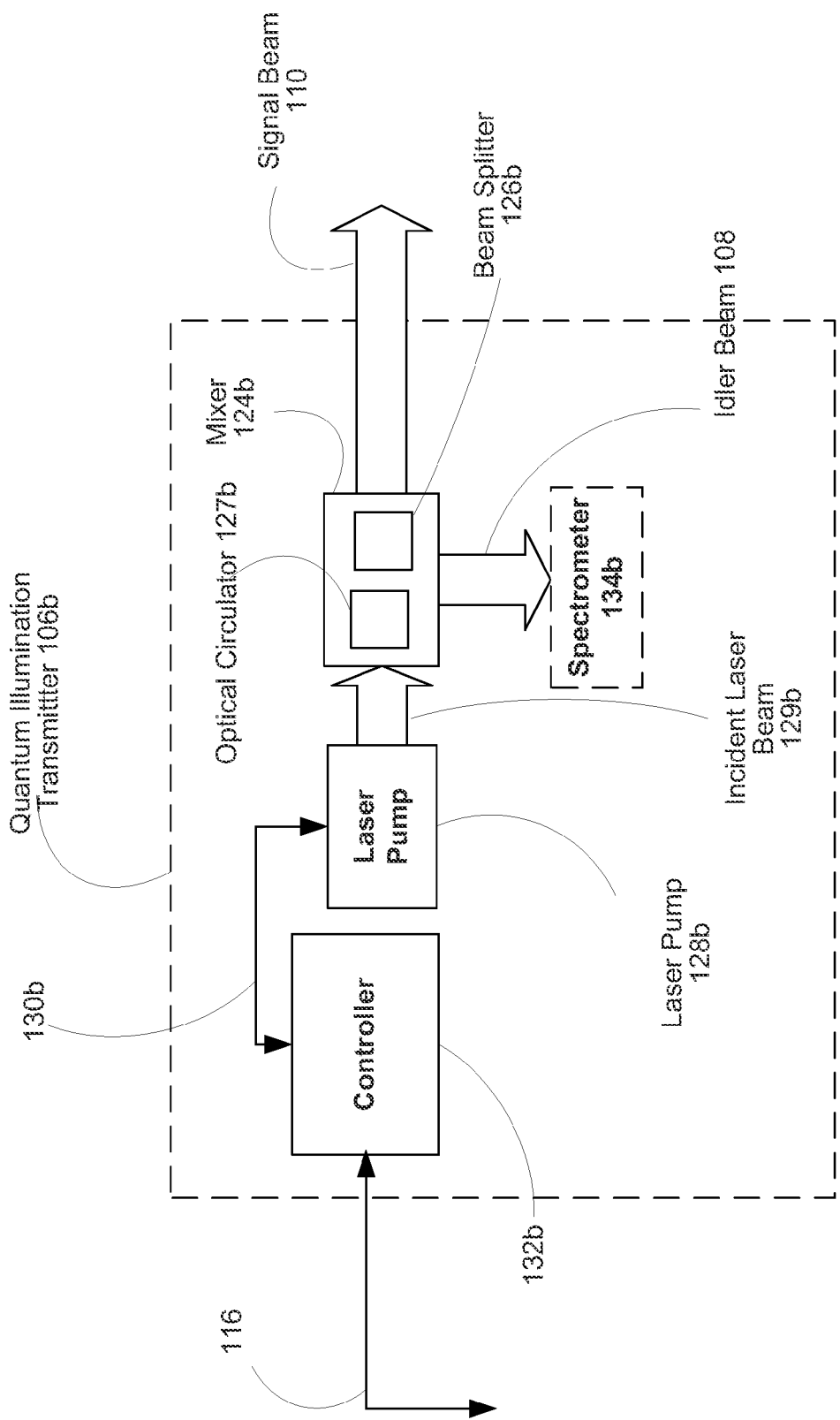
FIG. 1C is a block diagram of a four-wave mixing frequency-entanglement source-based transmitter for the system of FIG. 1A, according to an illustrative embodiment.

FIG. 1C is a block diagram of another illustrative embodiment of a transmitter 106b suitable for use as transmitter 106 in target detection system 100 of FIG. 1A. In this embodiment, an alternative to the transmitter embodiment of FIG. 1B, transmitter 106b includes a laser pump 128b, and a mixer 124b. The mixer 124b includes an optical circulator 127b and a beam splitter 126b. Optionally, the transmitter 106b may include a spectrometer 134b. Spectrometer 134b may be used to measure frequency characteristics of photons in a laser beam, e.g., idler beam 108. The spectrometer 134b and/or the laser pump 128b may be controlled by controller 132b via communication link 130b. In turn, the controller 132b may be in communication with computer processor system 120 via communication link 116. The communication links 116 and 130b may be any suitable optical, electrical, or opto-electrical wired or wireless link.

Mixer 124b in transmitter 106b generates the signal beam 110 and the idler beam 108 using the incident laser beam 129b from the laser pump 128b. In some embodiments, the mixer 124b may emit photon pairs at a rate of about 1 million photons/second. This number of photons is also referred to as the mean photon number. As described above, the signal and/or idler beams may comprise several different frequency-entangled (or equivalently, wavelength-entangled) modes. Each mode is associated with photons having unique characteristics, and each mode is associated with a particular frequency band of the corresponding signal and/or idler beams.

Mixer 124b also includes the beam splitter 126b. Any suitable beam splitter, e.g., a suitable prism, may be used in mixer 124b. In some embodiments, the mixer 124b includes a 50-50 beam splitter. In some embodiments, mixer 124b includes a unity-gain differential amplifier, or any other suitable amplifier. In other embodiments, mixer 124b includes a phase-conjugate mirror.

Mixer 124b splits photons in each mode of the incident laser beam 129b from the laser pump 128b into pairs of photons such that the combined energy and momentum of each pair of photons equals the energy and momentum, respectively, of the originating photon. In some embodiments, mixer 124b may include a nonlinear crystal. In some embodiments, the nonlinear crystal is a Periodically Poled Lithium Niobate (PPLN) crystal. Mixer 124b splits photons in the incident laser beam 129b to create signal beam 110 and idler beam 108. As described in reference to FIG. 1C, 1D, 1E or 1F, the entanglement of signal-idler photon pairs can be exploited to detect the presence or absence of target 102, or an encoded communication from an optical communications system transmitter.

Figure 1D:
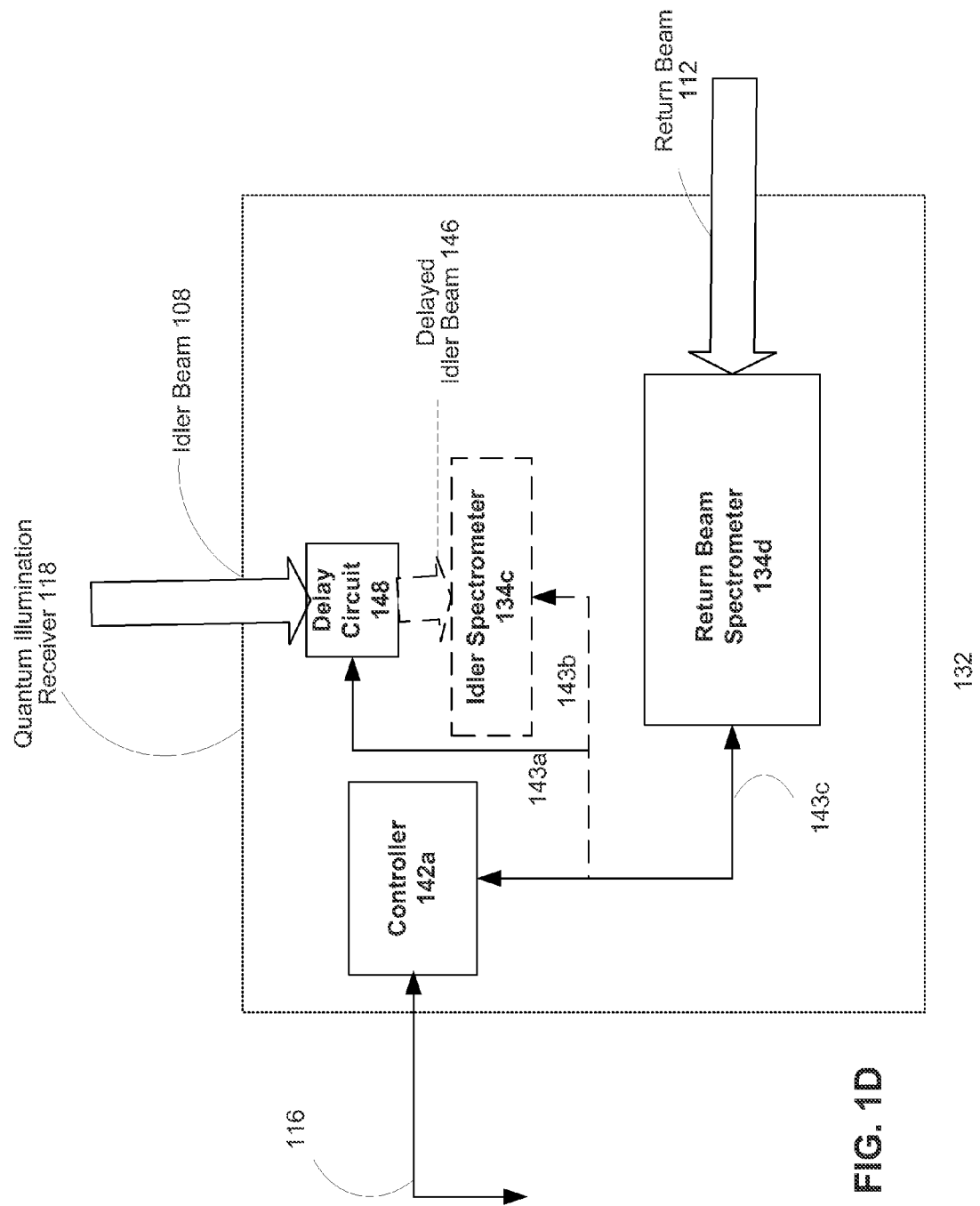
FIG. 1D is a block diagram of the receiver for the system of FIG. 1A including a delay circuit, according to an illustrative embodiment.

As described above, in some applications, it is useful to delay the idler beam 108 and use the delayed idler beam with the received return beam 112 for joint-detection of quantum entangled modes in the received return beam 112. FIG. 1D is a block diagram of an illustrative embodiment of the receiver 118a in system 100 of FIG. 1A with a delay circuit that generates a delayed idler beam 146. Receivers that do not include delay circuits are described with respect to FIG. 1E below.

Receiver 118a includes a return beam spectrometer 134d. Optionally, receiver 118a includes an idler beam spectrometer 134c. As described above, in some applications, it may be beneficial to synchronize the idler beam 108 and the received return beam 112 at the receiver to simplify the process of matching the modes associated with the photons in each of these two beams. Thus, receiver 118a includes a delay circuit 148 for delaying the idler beam 108 received from the beam collector in order to synchronize the idler beam 108 and the received return beam 112.

The delay circuit 148, idler beam spectrometer 134c or return beam spectrometer 134d may be controlled or selected by a controller 142a via communication links 143a, 143b, and 143c, respectively. In some embodiments, a user interacting with a user interface of computer processor system 120 selects the delay for the delay circuit 148. Thus, this delay is a parameter of detection system 100. In turn, the controller 142a may be in communication with computer processor system 120 via communication link 114. The communication links 114, 143a, 143b, and 143c may be any suitable optical, electrical, or opto-electrical wired or wireless link.

Delay circuit 148 may be an optical delay circuit such as an optical cavity or switch-able fiber length. Optical cavities, for example, allow for an increase in the distance traveled by a laser beam, or the laser's path length, by employing effectively a series of mirrors to iteratively reflect the laser beam. Each reflection thus induced creates an additional length that the laser beam travels.

Receiver 118a receives idler beam 108 (via a beam collector) from a quantum illumination transmitter such as transmitters 106a or 106b in FIGS. 1B and 1C, respectively. Receiver 118a generates a delayed version 146 of the idler beam 108. Receiver 118a also receives the return beam 112. The return beam 112 includes noise from the target region or a communications channel through which the return beam has traveled, and may also include a reflected component of the signal beam transmitted from the transmitter. A time-delayed version 146 of the idler beam 108 is created by the delay circuit 148 which delays the idler beam 108 such that the return beam 112 and the delayed idler beam 146 are synchronized such that the quantum modes in the two beams are matched. That is, these two beams are synchronized such that each frequency mode of the delayed idler beam 146 is matched with the corresponding frequency mode of the received return beam 112. The amount of delay in the delay circuit may be controlled by the controller 142a, and in turn by the computer processor system 120 via link 114.

Idler beam spectrometer 134c is used to process the idler beam 108 (or in some embodiments, the delayed idler beam 146), while return beam spectrometer 134d is used to process the return beam 112. The output of idler and return beam spectrometers 134c and 134d, respectively, are each transmitted to controller 142a, which in turn transmits the output to computer processor system 120 via link 116. As described above, frequency-entangled photons have unique characteristics. Measured individually, the signal-idler photon pairs exhibit broad spectrum uncertainty (i.e., large δω) in their respective frequency bands. However, the sum of their respective frequency bands is narrow enough that a measurement of the frequency band (i.e., Δω) associated with one of the photons in the pair, e.g., the idler beam 108, allows an accurate determination of the frequency band associated with the other photon in the pair, e.g., in the signal beam 110 (FIG. 1A).

Thus, idler beam spectrometer 134c of receiver 118a measures the frequency band associated with the delayed idler beam 146 and provides this measurement to controller 142a via link 143b. This frequency band is then provided to return beam spectrometer 134d or receiver 118a such that only frequency bands associated with this frequency band in the return beam 112 is processed and/or analyzed by return beam spectrometer 134d. Embodiments of the idler and return beam spectrometers 134c and 134d, respectively, are described further with respect to FIG. 1F.

Figure 1E:
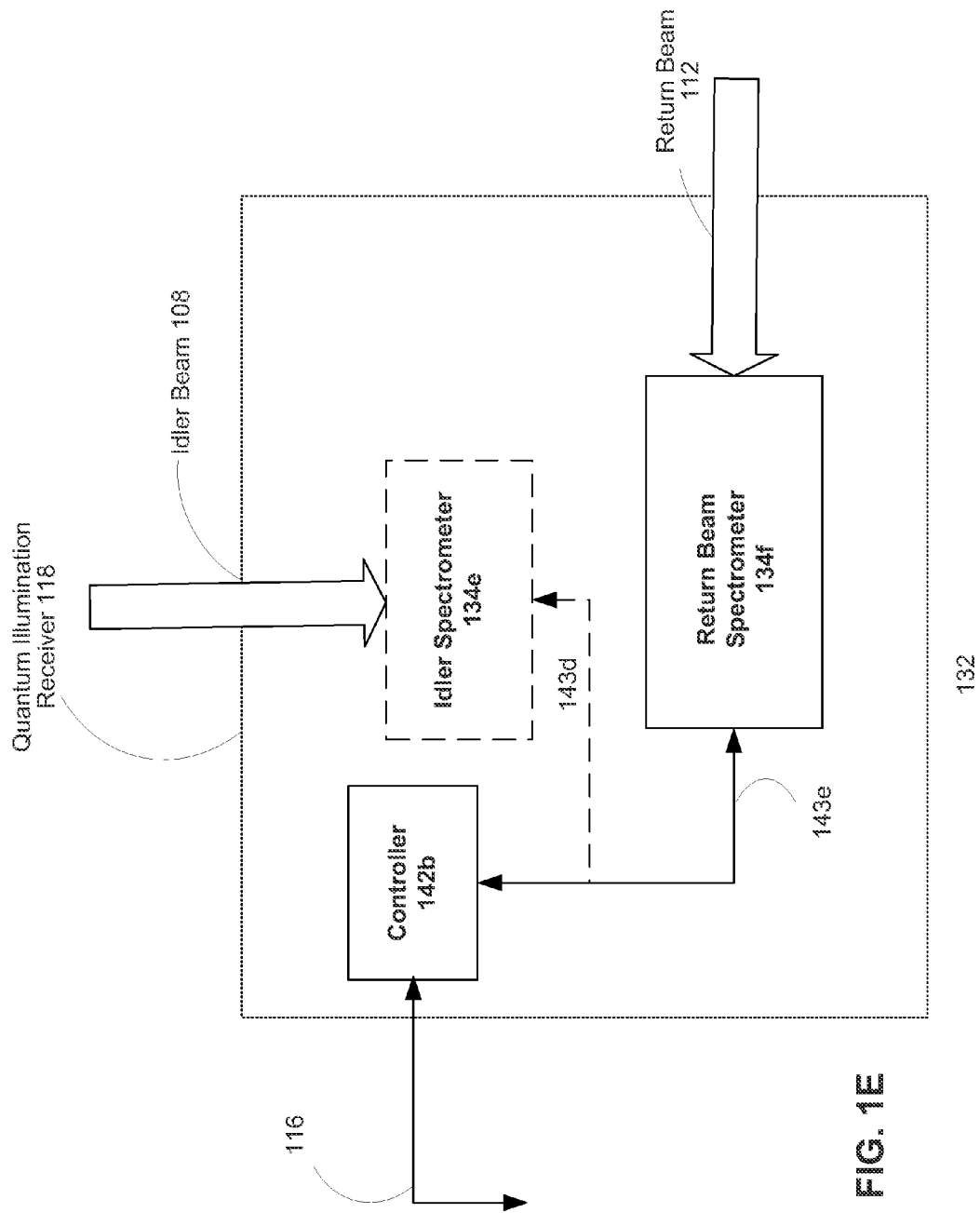
FIG. 1E is a block diagram of the receiver for the system of FIG. 1A without a delay circuit, according to an illustrative embodiment.

FIG. 1E is a block diagram of an illustrative embodiment of the receiver 118b in system 100 of FIG. 1A without a delay circuit. In some applications, instead of delaying the idler beam 108, the modes of the idler beam 108 and the received return beam 112 are matched using other processing techniques as described below.

Receiver 118b includes a return beam spectrometer 134f. Optionally, receiver 118a includes an idler beam spectrometer 134e. As described above, in some applications, it may be beneficial to synchronize the idler beam 108 and the received return beam 112 at the receiver to simplify the process of matching the modes associated with the photons in each of these two beams.

The idler beam spectrometer 134e or return beam spectrometer 134f may be controlled or selected by a controller 142b via communication links 143d and 143e, respectively. The controller 142b may be in communication with computer processor system 120 via communication link 114. The communication links 114, 143d, and 143e may be any suitable optical, electrical, or opto-electrical wired or wireless link.

Receiver 118b receives idler beam 108 (via a beam collector) from a quantum illumination transmitter such as transmitters 106a or 106b in FIGS. 1B and 1C, respectively. Receiver 118b also receives the return beam 112. The return beam 112 includes noise from the target region or a communications channel through which the return beam has traveled, and may also include a reflected component of the signal beam transmitted from the transmitter. Idler beam spectrometer 134e is used to process the idler beam 108, while return beam spectrometer 134f is used to process the return beam 112. The output of idler and return beam spectrometers 134e and 134f, respectively, are each transmitted to controller 142b, which in turn transmits the output to computer processor system 120 via link 116.

Frequency-entangled photons have unique characteristics. Measured individually, the signal-idler photon pairs exhibit broad spectrum uncertainty (i.e., large δω) in their respective frequency bands. However, the sum of their respective frequency bands is narrow enough that a measurement of the frequency band (i.e., Δω) associated with one of the photons in the pair, e.g., the idler beam 108, allows an accurate determination of the frequency band associated with the other photon in the pair, e.g., in the signal beam 110 (FIG. 1A).

Thus, idler beam spectrometer 134e of receiver 118b measures the frequency band associated with the idler beam 108, and provides this measurement to controller 142b via link 143b. This frequency band information is then provided to return beam spectrometer 134f of receiver 118b such that only this frequency band in the return beam 112 is processed and/or analyzed by return beam spectrometer 134f. In some embodiments, concurrent with or prior to providing the frequency band information to the return beam spectrometer 134f of receiver 118b, the frequency band associated with the photons in the idler beam 108 are matched with the frequency band associated with the photons in the received return beam 112. For instance, if the frequency band associated with the idler beam 108 is the frequency band centered at 2 GHz, and the sum of the idler beam 108 frequency and the received return beam frequency is centered at 6 GHz, then controller 142b may instruct spectrometer 134f to search for a frequency band centered at the difference, 4 GHz, of the received return beam 112. In this manner, the receiver 118b ensures that the measurement of the photons associated with the frequency band of interest in the idler beam 108 by spectrometer 134e coincides with the measurement of the photons associated with the frequency band of interest in the received return beam 112 by spectrometer 134f. Embodiments of the idler and return beam spectrometers 134e and 134f, respectively, are described further with respect to FIG. 1F.

Figure 1F:
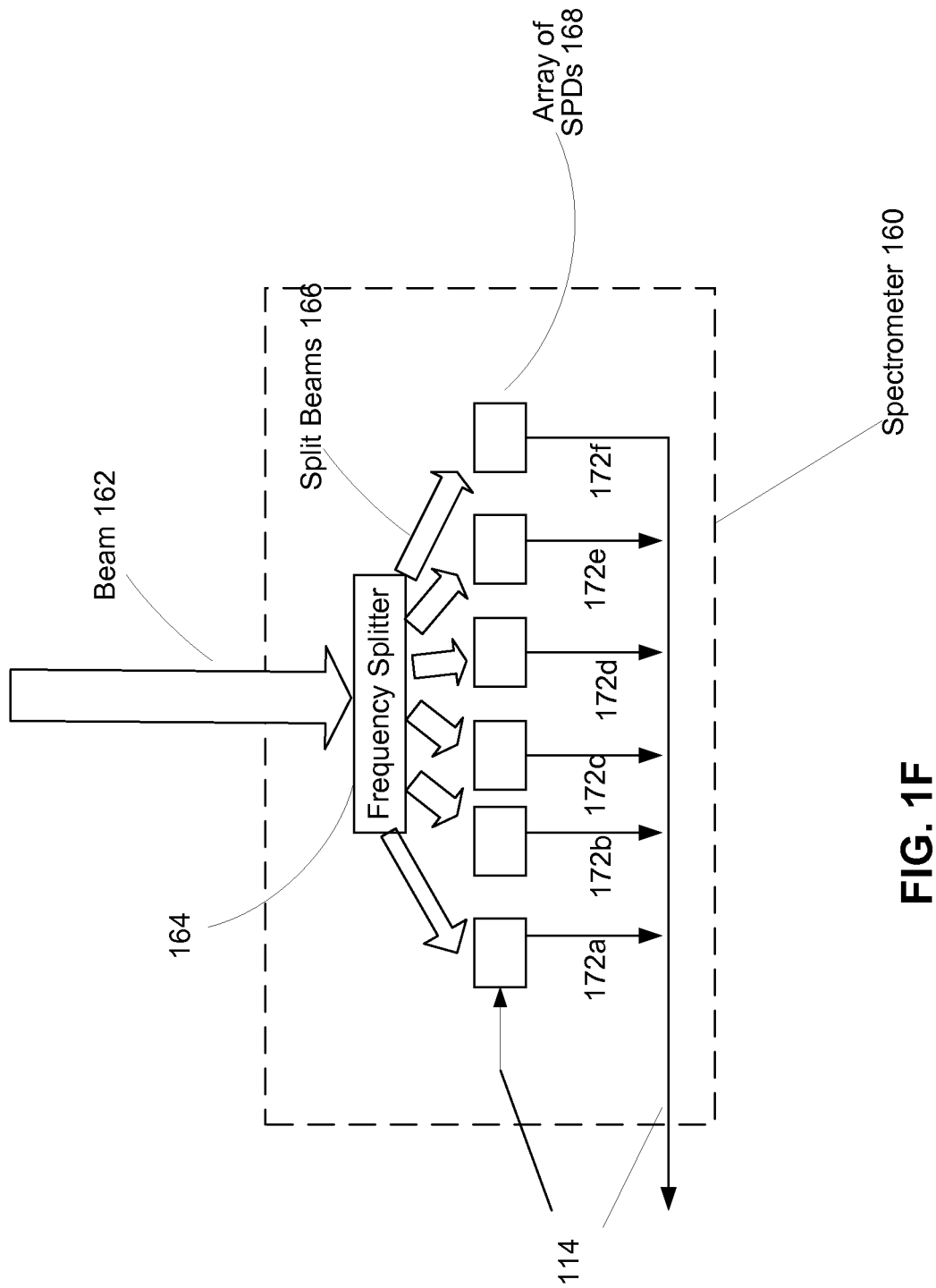
FIG. 1F is a block diagram of a spectrometer comprising a frequency splitter and an array of single photon detectors in either the transmitters of FIG. 1B or 1C, or the receiver of FIG. 1D or 1E, according to an illustrative embodiment.

FIG. 1F is a block diagram of a spectrometer 160, according to an illustrative embodiment. Spectrometer 160 may be used in the quantum illumination receiver described in FIGS. 1A, 1D and 1E, e.g., as spectrometers 134c, 134d, 134e and 134f.

Spectrometer 160 includes a frequency splitter 164 (e.g., a prism) and an array of single photon detectors (SPDs) 168. The frequency splitter splits a received beam 162 (e.g., return beam 112 of FIG. 1D) at the input of the spectrometer 160 into a series of laser beams 166. Each of these laser beams 166 occupies a different part of the frequency spectrum, and thus each has an associated frequency band. In some embodiments, the frequency splitter may be a prism in which case each of the photons that reach the prism's surface are refracted through the prism is dependent on the spectral frequency band of the respective photons. For instance, higher-frequency band photons may be refracted at a greater angle than lower-frequency band photons. Each of the resultant "split" frequency band laser beams 166 is transmitted to a single photon detector (172a, 172b, 172c, 172d, 172e, 172f) in the array of single photon detectors. In this manner, each of these single photon detectors counts the number of photons in one of the frequency band splits of the received beam 162. As only one of these frequency band splits corresponds to a frequency band of interest in the idler beam 108 (FIG. 1E) or delayed idler beam 146 (FIG. 1D), it is only the output of the single photon detector measuring the photons associated with this frequency band split that is of relevance to the detection system 100 (FIG. 1A). Determining the relevant frequency band split may be performed in at least two different ways as described below.

In some embodiments, as spectrometer 160 communicates with receiver 118 (FIG. 1A, FIG. 1D) via communication link 114, spectrometer 160 receives, through communication link 114, information regarding which output of the array of single photon detectors (172a, 172b, 172c, 172d, 172e, 172f) is to be transmitted to the computer processing system 120 (FIG. 1A) for further processing. This information may be based upon a measurement of the frequency band associated with photons of either the delayed idler beam 146 or idler beam 108 (FIGS. 1D and 1E, respectively).

In other embodiments, the computer processing system 120 (FIG. 1A) receives the outputs of each of the array of single photon detectors (172a, 172b, 172c, 172d, 172e, 172f) via communication link 114. These outputs are then processed via a matching algorithm to determine a match, i.e., which of the single photon detectors (172a, 172b, 172c, 172d, 172e, 172f) provides a measurement of the number of photons associated with the frequency band associated with photons of either the delayed idler beam 146 or idler beam 108 (FIGS. 1D and 1E, respectively). For instance, the matching algorithm implemented on computer processor system 120 (FIG. 1A) may sum the outputs of each of the single photon detectors in each of the idler beam and return beam spectrometers and correlate the sum of the resultant outputs. A determination of the single photon detector and the number of photons allows for the determination of the frequency band associated with photons in either the delayed idler beam 146 or idler beam 108 (FIGS. 1D and 1E, respectively).

Figure 1G:
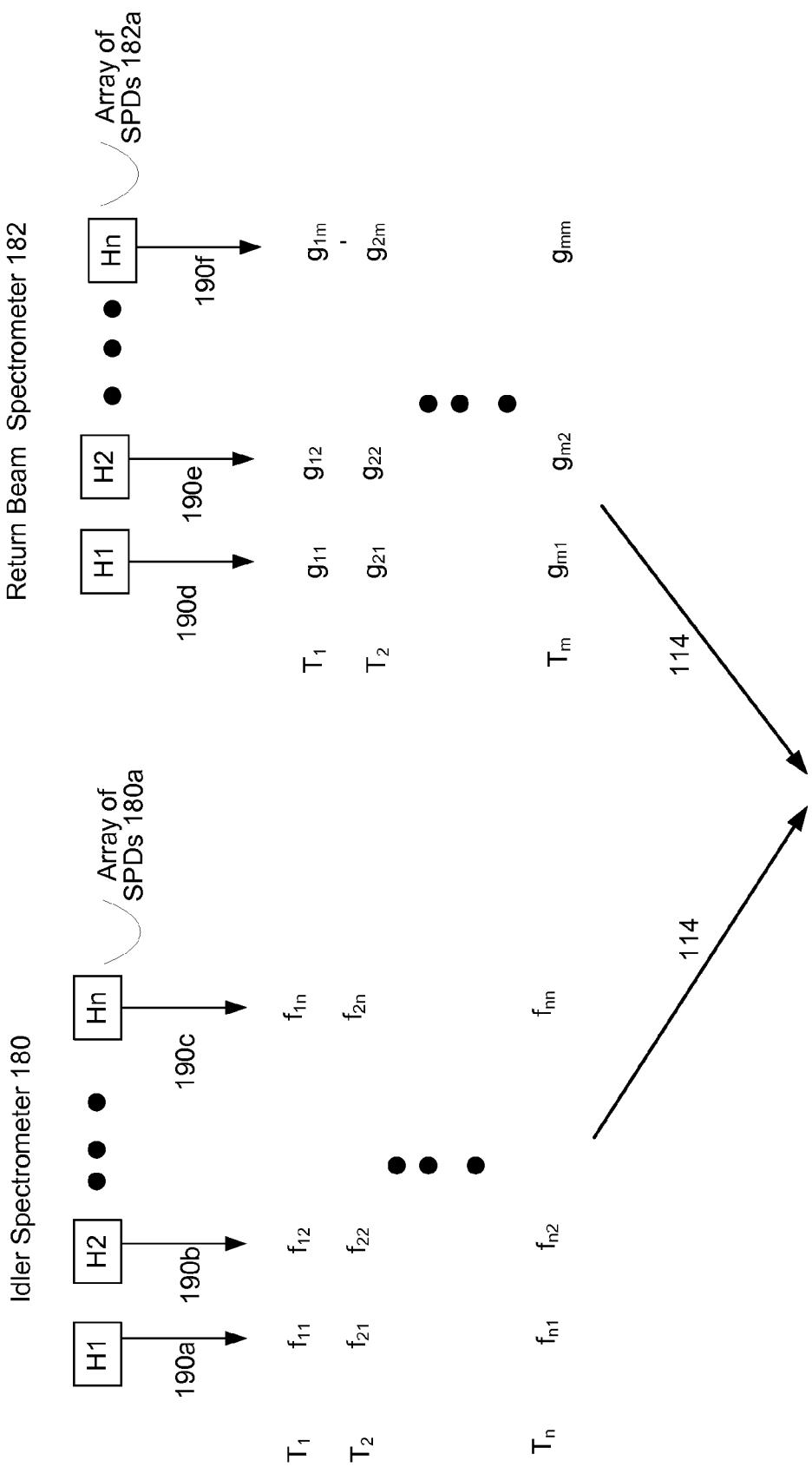
FIG. 1G is a schematic of an idler beam spectrometer and a return beam spectrometer illustrating how photons associated with frequency bands of the received beams are processed by the computer processing system of FIG. 1A, according to an illustrative embodiment.

In alternative embodiments, the matching algorithm may match the outputs of the single photon detectors of the idler beam and return beam spectrometers that have been generated over time as illustrated in FIG. 1G. FIG. 1G is a schematic of an idler beam spectrometer 180 and a return beam spectrometer 182 with arrays of single photon detectors 180a and 182a. Each of the single photon detectors 190a, 190b, ..., 190c, 190d, 190e, ..., 190f are associated with one of the frequency bands H1 through Hn. At time T1, each of the single photon detectors in the array 180a produces photon counts f11 through f1n and each of the single photon detectors in the array 182a produces photon counts g11 through g1m. Over times T2 through Tn (or Tm), the single photon detectors in each of the arrays 180a and 182a produces photon counts f21 through fnn and g21 through gmm, respectively. These counts are then transmitted to the computer processing system 120 (FIG. 1A) for processing via communication link 114. The computer processing system 120 (FIG. 1A) may process the received photon counts by matching the photon counts received at particular times by each of spectrometers 180 and 182 such that the measurements of photons in the frequency band associated with the photons in the idler beam 108 (FIG. 1A) are used to determine the relevant frequency band (and thus, single photon detector in the array 182a) for the received return beam 112 (FIG. 1A). For example, computer processing system 120 (FIG. 1A) may determine that the photon counts f21 through f2n at time T2 are best matched with the photon counts g31 through g3m at time T3. Computer processing system 120 (FIG. 1A) may also determine that photon count g2n and frequency band Hn are associated with the idler beam 108 (FIG. 1A). As a result of the matching process, computer processing system 120 (FIG. 1A) may then determine that the frequency band associated with the photons in the return beam 112 (FIG. 1A) is frequency band H2, such that photon count g32 is recorded as being associated with the transmitted signal beam 110 (FIG. 1A).

Figure 1H:
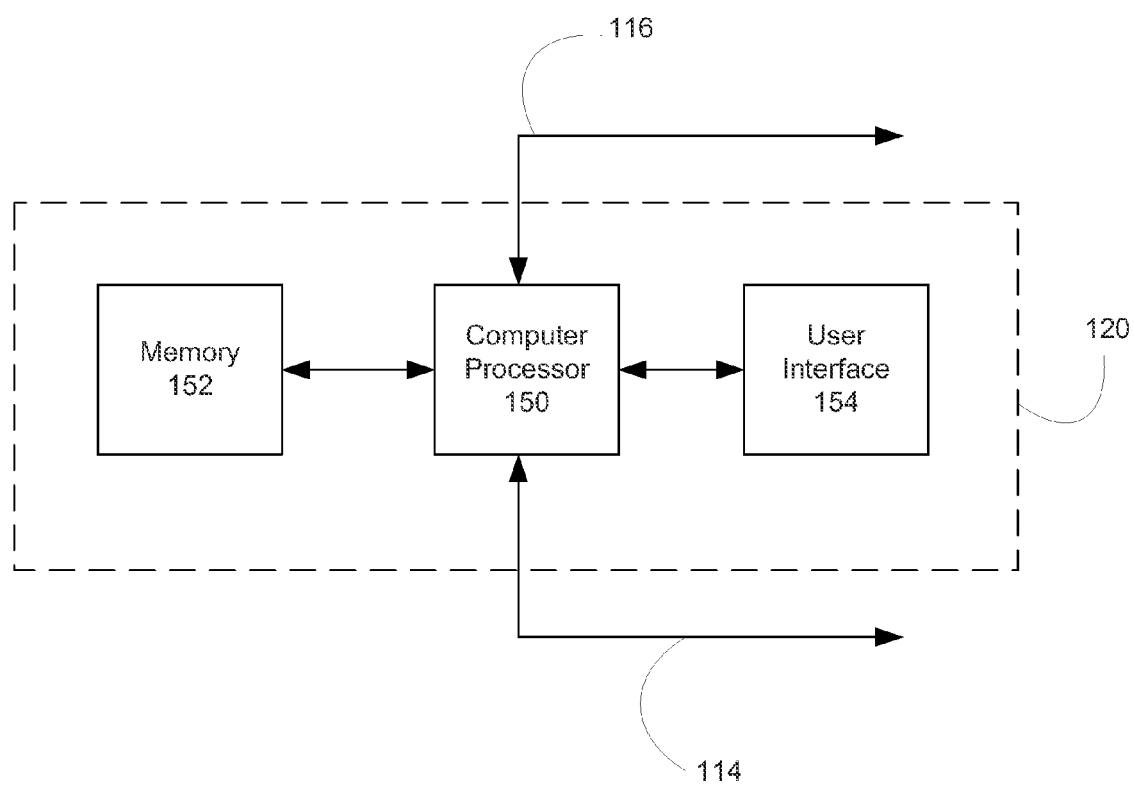
FIG. 1H is a block diagram of the computer processor system in the detection system of FIG. 1A, according to an illustrative embodiment.

FIG. 1H is a block diagram of the computer processor system 120 in the target detection system 100 of FIG. 1A, according to an illustrative embodiment. System 120 includes a computer processor 150 in communication with a memory device 152 and a user interface 154. The system 120 communicates with transmitter 106 via communication link 116, and with receiver 118 via communication link 114.

The computer processor 150 may carry out any suitable computations and/or instructions. The instructions could be provided via a user interacting with user interface 154 and/or computer-executable instructions loaded into memory 152. For example, computer processor 150 may be used to control the delay in the delay circuit 148 in receiver 118, control components in the SPDC 134 in receiver 118, or control components in the SPDC 124a in transmitter 106a (FIG. 1B) or mixer 124b in transmitter 106b (FIG. 1C).

User interface 154 may include a display and/or user input devices such as a mouse, a keyboard, or a touch-screen panel. Each of the user input devices may be used to interact with the computer processor 150. For instance, a user may interact with the user interface to provide parameters and/or settings, e.g., a threshold for target detection, to computer processor 150 for the target detection process described later in relation to FIG. 2. The delay in the delay circuit 148 in receiver 118, for example, may be controlled by allowing a user to enter a distance d to the target region, after which computer processor 150 selects the delay that results in the much improved target-detection performance. In some embodiments, the user may select the delay itself. In other embodiments, the user may enter a range of distances to the target region, and the computer processor 150 may examine this range to select a delay that results in improved performance. Optionally, the user may provide a range of delays which computer processor 150 may use to determine a delay that results in improved target-detection or communications system performance.

The process implemented in the system of FIGS. 1A-G will now be described in relation to FIGS. 2 and 3.

Figure 2:
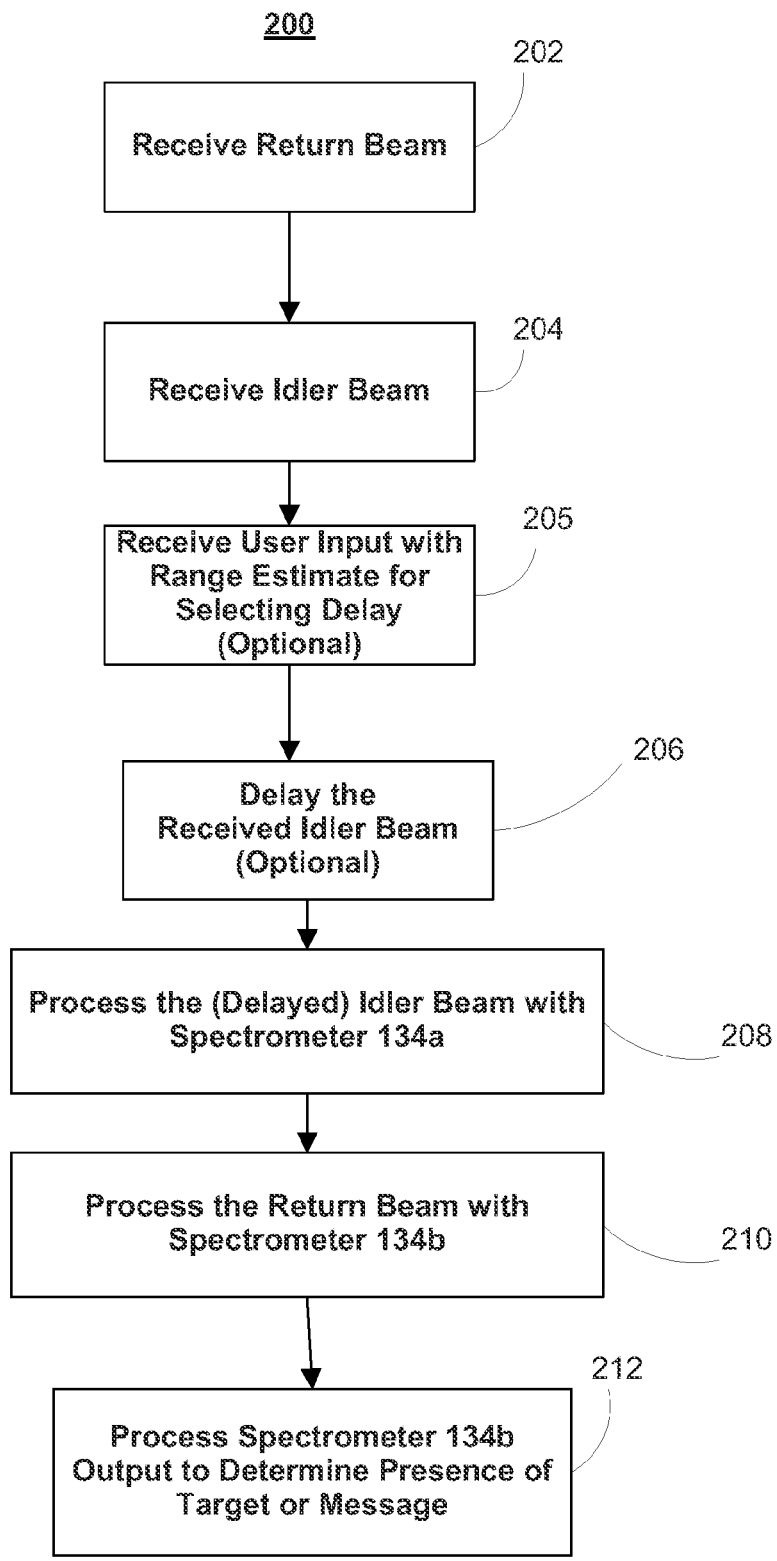
FIG. 2 is a process flow diagram of an exemplary process for operating the detection system of FIGS. 1A-1H, according to an illustrative embodiment.

FIG. 2 is a process flow diagram of an exemplary process 200 for operating a quantum illumination receiver, according to an illustrative embodiment. Process 200 may be carried out by receiver 118 of FIGS. 1A, 1D, 1E and 1F, in conjunction with computer processor system 120 of FIGS. 1A and 1H.

With continued reference to FIGS. 1A-G and FIG. 2, process 200 begins when receiver 118 receives return beam 112 (202) and also receives idler beam 108 (204). Optionally, controller 142 then receives a user input with a range estimate for selecting the delay associated with the delay circuit 148 (205). This user input may in turn be received from computer system 120 via communication link 116. Optionally, receiver 118 then delays the received idler beam 108 to synchronize the idler beam 108 with the received return signal beam 112 (206). The resulting delayed idler beam 146 or the idler beam 108 itself is processed by spectrometer 134a (208). Spectrometer 134a may include a frequency splitter (e.g., a prism) and an array of photon detectors, and is used to determine the spectral frequency band associated with the photons in the delayed idler beam 146 or the idler beam 108 itself. The return beam 112 is then processed by spectrometer 134b (210). Spectrometer 134b or 134f includes a frequency splitter and an array of single photon detectors. In some embodiments, spectrometer 134d or 134f receives an indication of the determined frequency band associated with the delayed idler beam 146 photons or the photons associated with the idler beam 108 itself. Based on the received indication, one of the single photon detectors is passed on to computer processor system 120. The output of this single photon detector in spectrometer 134b is processed to determine the presence of a target or an encoded communication (212). In other embodiments, spectrometer 134b passes all of its outputs to computer processor system 120 without receiving an indication of the determined frequency band associated with the delayed idler beam 146 photons or the photons associated with the idler beam 108 itself. The outputs of the array of single photon detectors in spectrometer 134b are processed to determine the presence of a target or an encoded communication (212).

Figure 3:
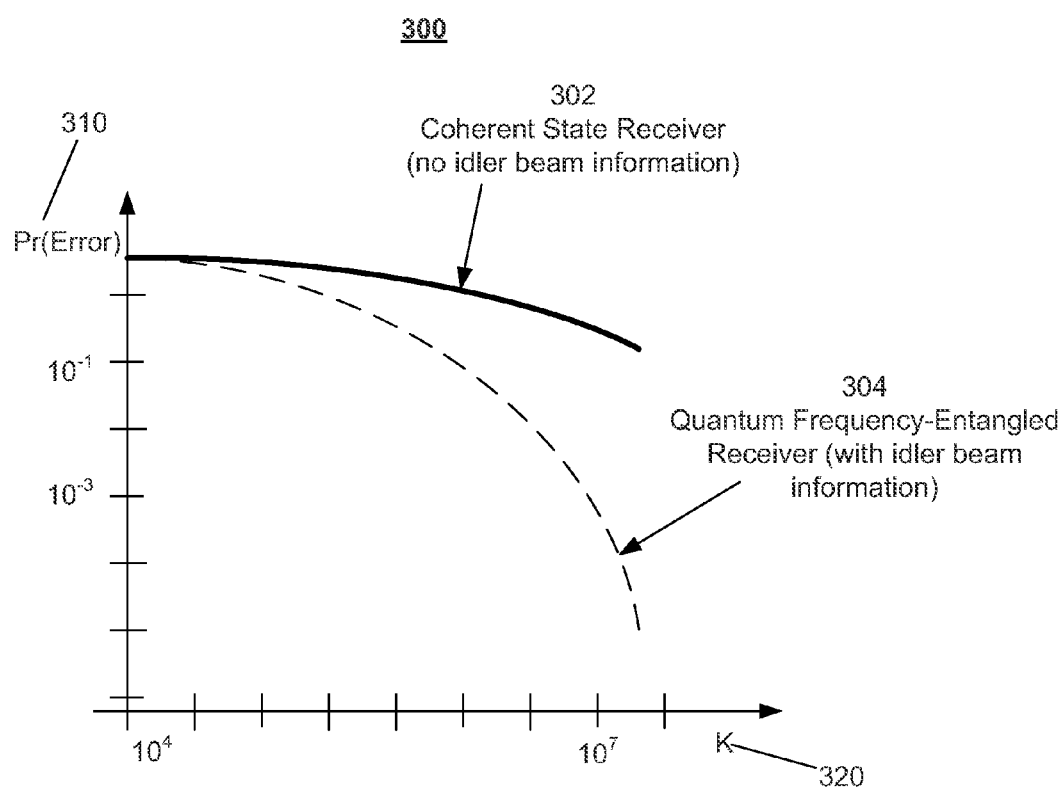
FIG. 3 illustrates a set of probability-of-error curves representative of the error-probability performance as a function of the number of received modes achieved by the detection system with and without idler beam information, according to an illustrative embodiment.

FIG. 3 is a performance graph 300 showing the error probability performance of the quantum illumination receiver 118 of FIGS. 1A, 1D, and 1E, when used for a target detection process, according to an illustrative embodiment.

Graph 300 in FIG. 3 shows the theoretical error probability Pr(Error) on the y-axis 310 versus the number of modes K in the measured output beam on the x-axis 320. The theoretical error probability for quantum illumination receivers is generally dependent, for example, upon the mean number of photons per mode in the signal, the mean number of photons entering the receiver, the ratio R of the coincidence bandwidth ($\Delta\omega$) to the spectral bandwidth ($\delta\omega$) of the one of the signal-idler photon pairs, and the number of modes K. In graph 300, it was assumed that R=300.

While many target detection decision rules are possible, one suitable decision rule assumes that computer processor 150 (FIG. 1H) decides between two (binary) hypotheses $H_0$ and $H_1$. $H_0$ is the hypothesis that states that a target 102 (FIG. 1A) is absent from the target region 104 (FIG. 1A), while $H_1$ is the hypothesis that states that a target 102 (FIG. 1A) is present in the target region 104 (FIG. 1A). The probability of error is given by:

$$Pr(\text{Error})=P(H_0)P(H_1|H_0)+P(H_1)P(H_0|H_1) \quad \text{(EQN. 1)}$$

In graph 300, it was assumed that $P(H_0)=0.5$, and $P(H_1)=0.5$.

With no access to the idler beam frequency measurement, the probability of error is given by:

$$Pr(H_0)=1-\exp(-R\bar{n}_{th}) \quad \text{(EQN. 2)}$$

$$Pr(H_1)=1-\exp(-R\bar{n}_{th}+\eta\bar{n}_{si}) \quad \text{(EQN. 3)}$$

where $n_{th}$ is the mean number of photons per received mode, $\eta$ is a constant, and $n_{si}$ is the number of photons in the return signal beam 112. In the limit that R>>1 and $n_{th}$<<1, these expressions may be approximated by Poisson probability distributions. In graph 300, it was assumed that $n_{th}$ is $10^{-6}$ and $\eta n_{si}$ is $10^{-3}$.

With access to the idler beam frequency measurement, the probability of error is proportional to the expressions in Equations 2 and 3 above with the proportionality constant being 1/R. Thus, with access to the idler beam frequency, the probability of correctly detecting the target is much higher or equivalently, the probability of error in detecting the target is much lower.

Using a coherent laser transmitter, the theoretical error bounds for detection are illustrated with line 302. Using a quantum illumination transmitter such as system 100 in FIG. 1A, which employs the target detection processes described in FIG. 2, the theoretical error bounds for target detection are illustrated with line 304. The performance gain that a well-designed quantum illumination receiver can achieve over the optimally-designed classical laser-radar based system is several orders of magnitude, particularly when the number of modes is larger than $10^6$. For instance, when the number of modes K=$10^6$, the Pr(Error)=0.5 for a coherent state receiver and Pr(Error)=$10^{-3}$ for a quantum frequency-entangled receiver.

The invention may be embodied in other specific forms without departing from the spirit or essential characteristics thereof. For instance, the methods and systems described herein may be employed in any optical, electrical, or electro-optical system, without limitation. The forgoing embodiments are therefore to be considered in all respects illustrative, rather than limiting of the invention. For instance, while embodiments have been described with relation to target detection and optical communications, such embodiments may also be used for range estimation, imaging and/or other optical sensing applications including, but not limited to, high-precision microscopy, lithography and metrology.

What is claimed is:

1. A detection system comprising:
a transmitter including:
a quantum frequency entanglement source for outputting an output beam including a signal beam and an idler beam, wherein the photons in the idler beam are quantum-mechanically entangled in frequency with corresponding photons in the signal beam;
transmission optics for directing the signal beam towards a remote surface; and
a first spectrometer for measuring a frequency band associated with photons in the idler beam;
a receiver including:
a beam collector for receiving a return beam including photons from the signal beam reflected by the remote surface;
a second spectrometer for identifying the frequency band associated with the photons in the received return beam; and
a frequency splitter for splitting the received return beam into a series of frequency bands associated with the received return beam, the frequency splitter being tunable to the frequency band associated with the photons in the received return beam; and a processor in communication with the receiver and the transmitter configured to process the outputs of the first and second spectrometers to determine one of the presence of a target in a target region or a message encoded within the received return beam.

2. The system of claim 1, wherein the remote surface is a target and the system is a target detection system, and wherein the processor is further configured to determine the presence of the target in a target region.

3. The system of claim 2, wherein the processor is further configured to control a delay of the received idler beam based on a distance between the transmitter and the remote surface, wherein the delay is provided by a delay circuit.

4. The system of claim 1, wherein the remote surface modulates the signal beam and the system is an optical communication system, and wherein the processor is further configured to decode the message encoded within the received return beam.

5. The system of claim 1, wherein the first spectrometer includes an array of single-photon detectors configured to detect photons associated with the idler beam.

6. The system of claim 1, wherein the second spectrometer includes an array of single-photon detectors configured to detect photons associated with the received return beam.

7. The system of claim 1, wherein the quantum frequency entanglement source includes a spontaneous parametric downconverter (SPDC).

8. The system of claim 7, wherein the quantum frequency entanglement source includes a laser pump for directing a laser beam into the SPDC to entangle the signal and idler beams in frequency.

9. The system of claim 1, wherein the quantum frequency entanglement source includes a nonlinear crystal that is constructed from a material selected from the group comprising lithium niobate and potassium titanyl phosphate.

10. The system of claim 1, further comprising:
a user interface in communication with the processor for selecting a parameter associated with the system, wherein the parameter is one of a delay or a frequency associated with photons of the idler beam.

11. A method for operating a detection system comprising:
outputting, by a quantum frequency entanglement source of a transmitter, an output beam including a signal beam and an idler beam, wherein the photons in the idler beam are quantum-mechanically entangled in frequency with corresponding photons in the signal beam;
directing, by transmission optics of the transmitter, the signal beam towards a remote surface;
measuring, by a first spectrometer of the transmitter, a frequency band associated with photons in the idler beam;
receiving, by a beam collector of a receiver, a return beam including photons from the signal beam reflected by the remote surface;
identifying, by a second spectrometer of the receiver, the frequency band associated with the photons in the received return beam;
splitting, by a frequency splitter, the received return beam into a series of frequency bands associated with the received return beam, the frequency splitter being tunable to the frequency band associated with the photons in the received return beam; and
processing, by a processor in communication with the receiver and the transmitter, the outputs of the first and second spectrometers to determine one of the presence of a target in a target region or a message encoded within the received return beam.

12. The method of claim 11, wherein the remote surface is a target and the system is a target detection system, further comprising:
determining, by the processor, the presence of the target in a target region.

13. The method of claim 11, further comprising:
controlling, by the processor, a delay of the received idler beam based on a distance between the transmitter and the remote surface, wherein the delay is provided by a delay circuit.

14. The method of claim 11, wherein the remote surface modulates the signal beam and the system is an optical communication system, further comprising:
decoding, by the processor, the message encoded within the received return beam.

15. The method of claim 11, wherein the first spectrometer includes an array of single-photon detectors, further comprising:
detecting, by the array of single-photon detectors, photons associated with the idler beam.

16. The method of claim 11, wherein the second spectrometer includes an array of single-photon detectors, further comprising:
detecting, by the array of single-photon detectors, photons associated with the received return beam.

17. The method of claim 11, wherein the quantum frequency entanglement source includes a spontaneous parametric downconverter (SPDC).

18. The method of claim 11, wherein the quantum frequency entanglement source includes a laser pump for directing a laser beam into the SPDC to entangle the signal and idler beams in frequency.

19. The method of claim 11, wherein the quantum frequency entanglement source includes a nonlinear crystal that is constructed from a material selected from the group comprising lithium niobate and potassium titanyl phosphate.

20. The method of claim 11, further comprising:
selecting, by a user interface in communication with the processor, a parameter associated with the system, wherein the parameter is one of a delay or a frequency associated with photons of the idler beam.

* * * * *